Oct. 11, 1938.  V. E. MORRISON  2,133,107
SELECTIVE SHIFT FOR ACCORDIONS
Filed June 29, 1936   3 Sheets-Sheet 1

Inventor:
Vaughn E. Morrison
by Burton & Burton
his Attorneys.

Oct. 11, 1938.  V. E. MORRISON  2,133,107
SELECTIVE SHIFT FOR ACCORDIONS
Filed June 29, 1936   3 Sheets-Sheet 2
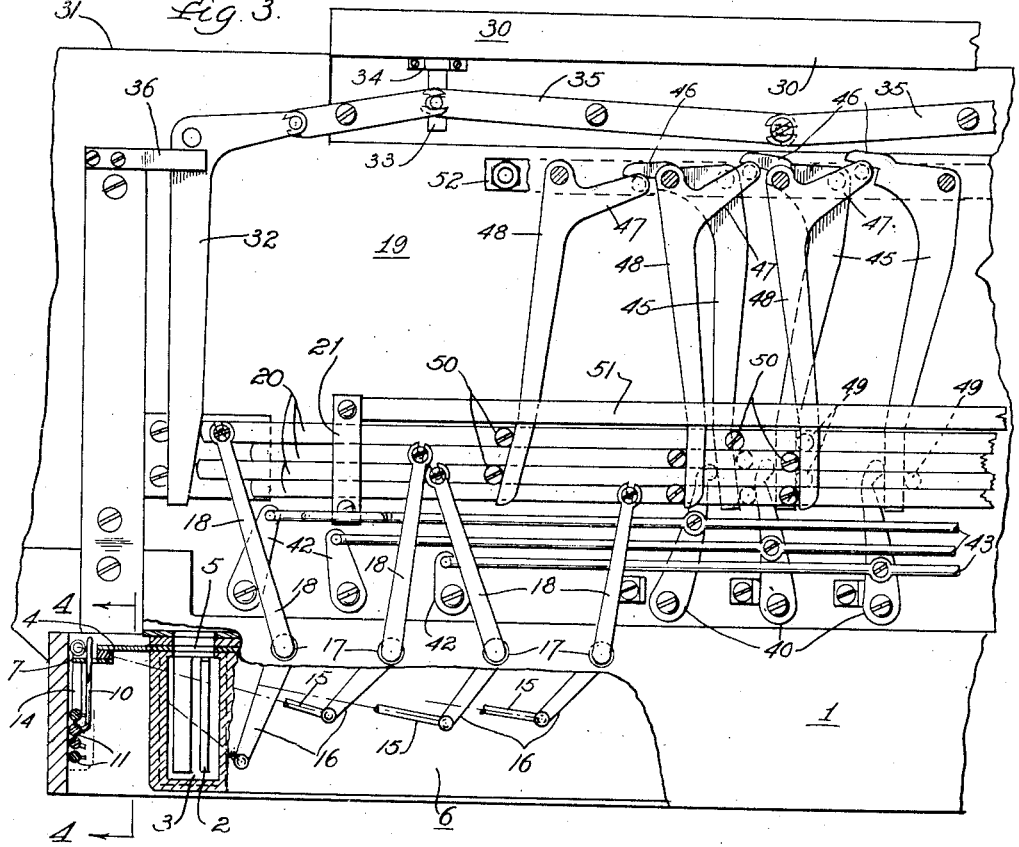
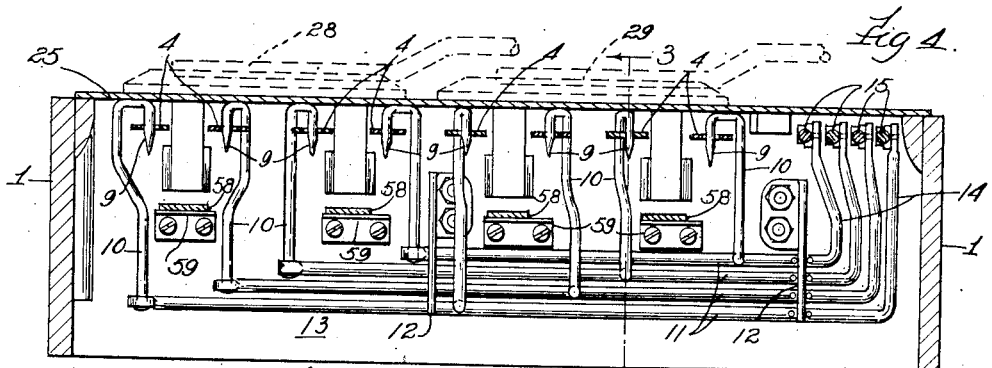
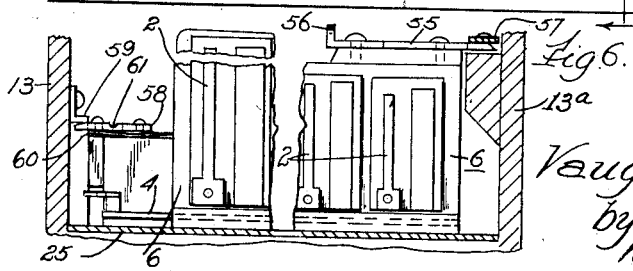
Inventor.
Vaughn E. Morrison.
by Burton & Burton
his Attorneys.

Oct. 11, 1938.   V. E. MORRISON   2,133,107
SELECTIVE SHIFT FOR ACCORDIONS
Filed June 29, 1936   3 Sheets-Sheet 3
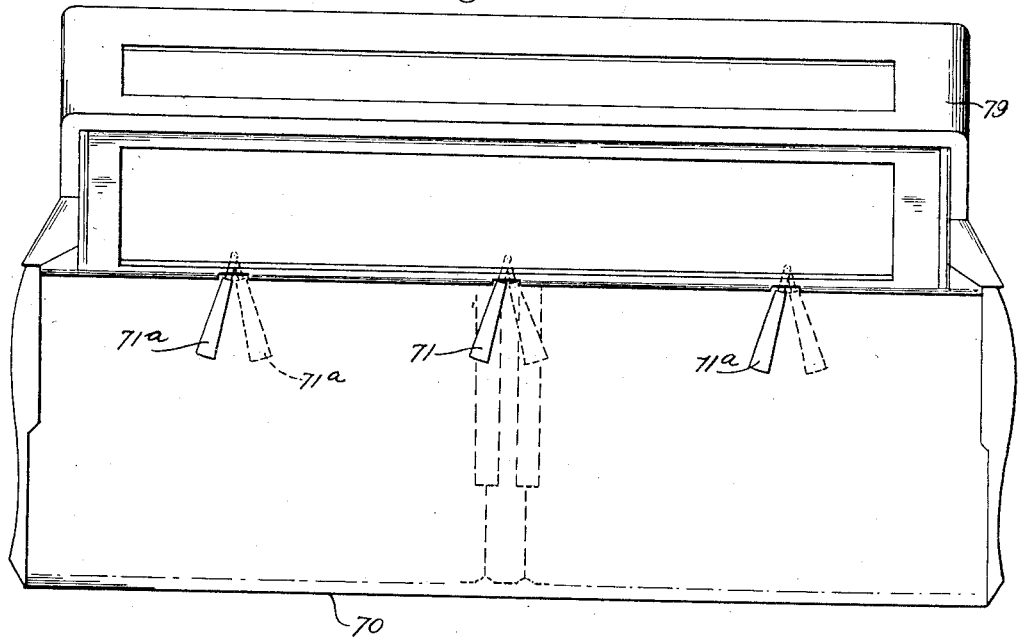
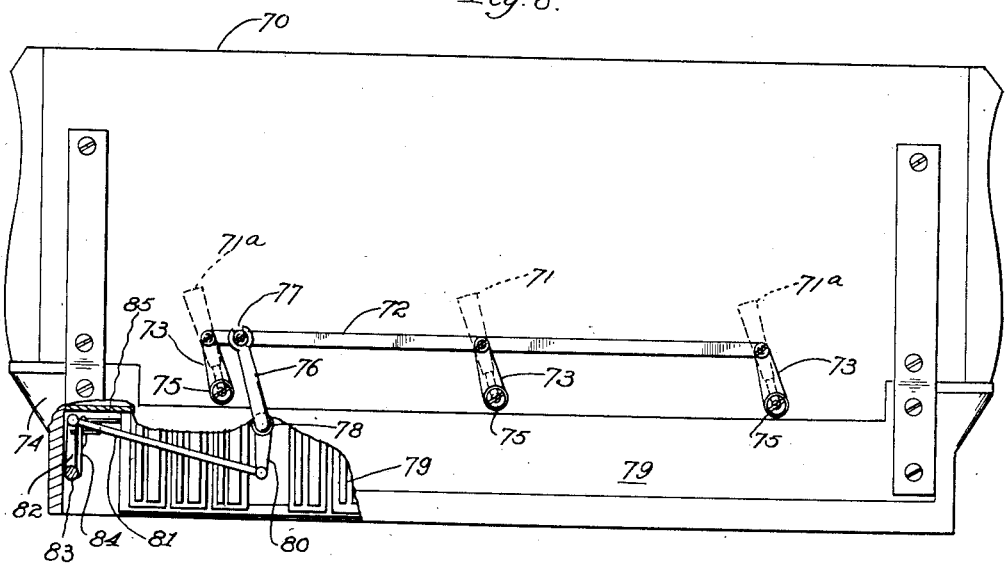

Patented Oct. 11, 1938

2,133,107

REISSUED

MAR 12 1940

UNITED STATES PATENT OFFICE 2,133,107

SELECTIVE SHIFT FOR ACCORDIONS

Vaughn E. Morrison, St. Charles, Ill., assignor to The Rudolph Wurlitzer Company, De Kalb, Ill., a corporation of Ohio Application June 29, 1936, Serial No. 87,843

28 Claims. (Cl. 84—376)

This invention relates to accordions and is shown herein as applied to the type known as the piano accordion. The object of the invention is to provide means for securing various combinations of reeds in producing different tonal effects and to furnish convenient and manually operable mechanism for shifting the valves which control the sounding of the several groups of reeds to be included in or excluded from the various arrangements as desired. The invention consists of various features and elements of construction in combination, as herein shown and described and as indicated by the claims.

In the drawings:

Figure 3 is a partial plan view similar to Figure 2 but on a larger scale, showing certain of the parts at a different position of adjustment.

Figure 4 is a transverse section taken through the wind-chest containing the reeds and looking toward one end wall thereof for showing the rock shafts by which motion is transmitted to the slide valves.

Figure 6 is a fragmentary detail view of the same parts taken as a section as indicated at line 6—6 on Figure 5.

Figure 7 is a somewhat diagrammatic plan view of the key manual and an adjacent reed chest showing a modified arrangement of shift mechanism.

Figure 8 is a bottom plan view of the key manual support showing the connections of the shifter levers with a slide valve associated with the reeds.

As is well understood, most accordions include several sets of reeds arranged so that one reed of each set may be vibrated simultaneously to produce a full, rich tone, sometimes referred to as "full accordion". Each group of reeds thus making up the full tone usually includes one reed representing the principal tone, one reed which is tuned slightly "off" so as to vibrate at a slightly different rate from the principal reed, sometimes producing a tremolo or vibrato effect, another reed tuned at an octave below the principal tone, and sometimes an additional reed tuned an octave above. The present construction assumes such an arrangement, utilizing four reeds for the full accordion combination, and the mechanism of the invention serves for eliminating one or more of the reeds, as desired, to produce the various tonal effects.

Figure 5:
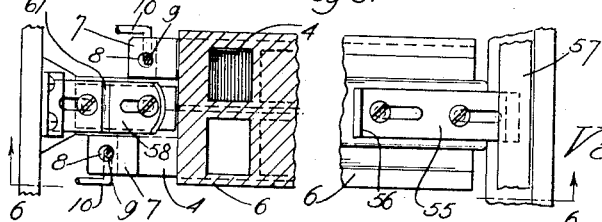
Figure 5 is a fragmentary view partly in section showing the end portions of the reed block and fastening means by which it is secured in the wind-chest.

The drawings do not show the reeds or reed chambers in detail, but in Figure 3 a portion of the wall of the wind-chest, 1, is broken away, revealing certain linkage and a few of the reeds, 2, which happen to be located directly back of the wall, 1. Figure 3 shows a portion of the reed block with one of the reed chambers, 3, in section, thus including a fragment of the slide valve member, 4, which may be adjusted, as shown, with its port, 5, in registration with the chamber, 3, which is the "open" position of the valve member, but which may be slidably moved to carry the port, 5, out of registration with the reed chamber, 3, thus closing the chamber and eliminating its particular reed, 2, from the resulting tone combination. The slide valve, 4, as will be understood, extends throughout the length of the reed block, 6, in which the reed chamber, 3, is located. In the structure illustrated each reed block, 6, is formed with a double row of reed chambers in accordance with standard practice, and therefore includes two slide valves, 4, each of which is common to all the reed chambers and reeds in one row of the block. The terminals, 7, of the slide valves, 4, are seen in Figure 5, each formed with an aperture, 8, by which the terminal is engaged with the hooked end, 9, of a rocker arm, 10. These arms, 10, extend rigidly from rock shafts, 11, journaled in the bearing plates, 12, which are secured to the end wall, 13, of the wind-chest in which the reed blocks are mounted. The rock shafts with their arms, 10, in connection with the terminals, 7, constitute a portion of the linkage by which the slide valves, 4, are adjusted to open or closed position, as desired.

Each of the rock shafts, 13, has an operating crank arm, 14, from which there extends a link, 15, to one arm, 16, of a lever fulcrumed at 17 in the wall, 1, of the wind-chest. The fulcrum portion of each lever extends through a snugly fitting and substantially air-tight bearing aperture in the wall, 1, so that the arms, 16, of these levers which are connected to the links, 15, are inside the wind-chest, while the other arms, 18, are located outside and extend over the bottom wall, 19, of the key manual support. On this bottom wall, 19, I mount a plurality of control bars, 20, each connected to one of the lever arms, 18, and guided for sliding movement parallel to each other over the surface of the wall, 19. Such guidance is afforded by the transversely extending retaining bars or cleats, 21, and at one end I may provide a friction brake member, 22, held in contact with the bars, 20, by a spring arm, 23, for ensuring that each bar and its connected linkage will remain in adjusted position until purposely shifted. In the particular instrument herein illustrated I have shown four of the bars, 20, each corresponding to one group of reeds, but since the reeds of each group happen to be arranged in two separate reed blocks, there are two slide valves, 4, connected with each of the control bars, 20, by the linkage already described. In other words, each of the rock shafts, 11, carries two arms, 10, connected respectively to the two slide valves, 4, which correspond to a single group of reeds. In accordance with standard practice, the four reeds comprising the full accordion tone for any given pitch are placed against the ported wall, 25, of the wind-chest so that they may be controlled by a single valve attached to one of the keys of the manual. The piano-type manual consists of the usual white keys, 26, and black keys, 27, and the valves controlled by these keys are indicated at 28 and 29, in dotted outline on Figure 4; for the most part the white keys, 26, are connected to the row of valves, 28, and the black keys, 27, are connected to the other row of valves at 29. Thus each valve covers four ports leading to the four reeds which make up the full accordion tone, but any one of these ports may be closed individually by the movement of its slide valve, 4, to closed position, and the four slide valves corresponding to any given pitch are all operable by different rock shafts, 11, and therefore by different control bars, 20. Each control bar, 20, is thus connected for opening or closing the slide valves corresponding to one series or group of reeds, either the normal pitch reeds, the "off"-pitch reeds, the upper octave reeds or the lower octave reeds.

Figure 2:
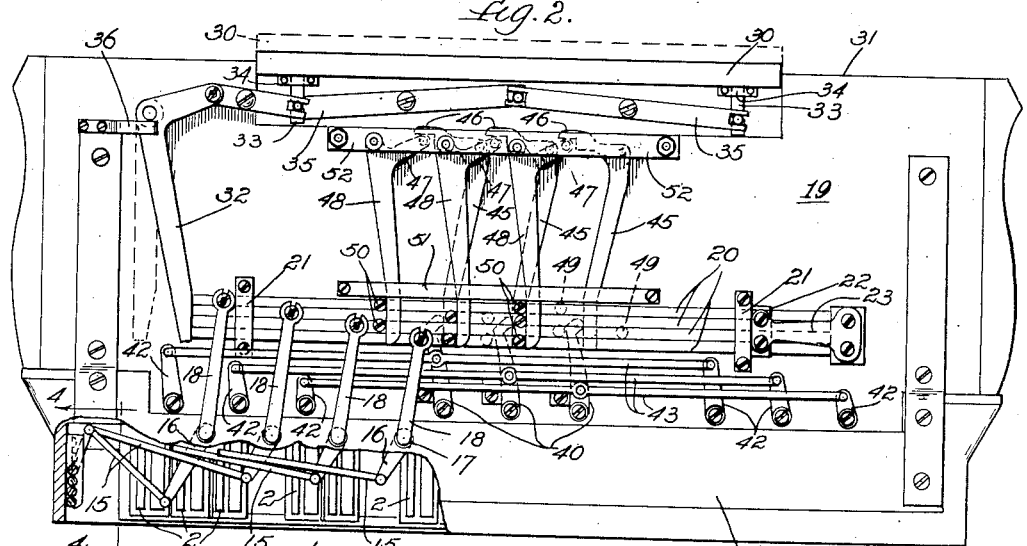
Figure 2 is a bottom plan view of the key manual support showing the control bars and actuators therefor, together with parts of the linkage connecting the bars with the slide valves which they operate.

A shifter bar, 30, is mounted in the front rail, 31, of the key manual support, and when pushed inwardly with the palm of the hand, this bar actuates a bell crank lever, 32, which engages the ends of the control bars, 20, and thrusts them toward their limit of movement at which the connected slide valves, 4, are all adjusted at open position. Thus, after any special adjustment of the slide valves the "full accordion" combination may be restored at any time by pressure on the bar, 30. When any of the control bars, 20, is shifted in the opposite direction its contact with the bell crank, 32, swings the latter about its pivot and shifts the bar, 30, to projected position indicated in dotted outline in Figure 2, and in full line in Figure 3. The bar, 30, is guided in its movement by rigid arms, 33, slidable in the guides, 34, and connected by equalizer levers, 35, to ensure smooth action of the bar. The lever, 32, may be provided with a friction spring, 36, for holding it and the connected bar, 30, at either limit of movement to which they may be adjusted.

Figure 1:
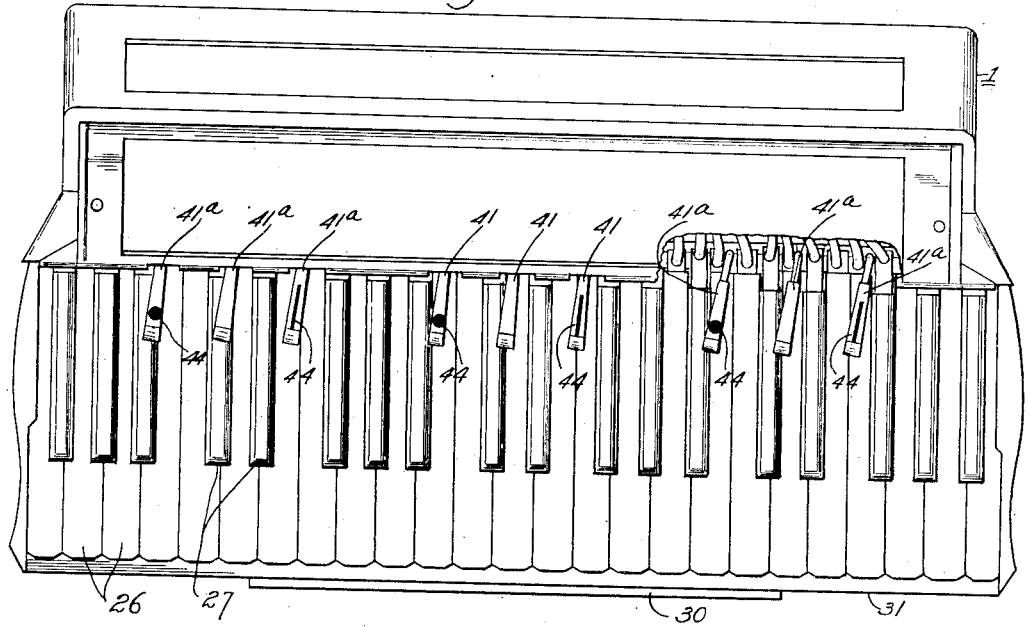
Figure 1 is a face view or plan view of a piano accordion key manual showing the shifter levers which are elements of the mechanism embodying this invention.

For securing combinations of the reeds other than the full accordion arrangement I provide shifter levers, 40, fulcrumed to swing over the under surface of the wall, 19, and provided with handles, 41, disposed as seen in Figure 1, extending in a plane slightly above that of the manual keys adjacent their inner ends. For purposes of illustration I have shown only three of these levers, 41, each corresponding to a different combination of reeds to be secured by adjustment of the slide valves, 4. The handle levers, 41, are shown mounted substantially at the middle of the keyboard, and for convenience additional handles, 41ª, are disposed in groups of three adjacent each end of the keyboard. One handle of each of these second groups is connected by lever arms, 42, and a link bar, 43, with the handle, 41, of the middle group, so that the player may utilize any one of the three connected handles, depending on which is most conveniently within his reach at the moment. If desired, the corresponding handles, 41 and 41ª, may be marked with similar symbols, 44, as shown in Figure 1, or may be designated by means of any convenient color scheme, assisting the player to distinguish readily between the three different handles of any one group. Each of the levers, 40, on the under side of the wall, 19, engages a bell crank, 45, which is one of a pair of actuator parts arranged to transmit movement to the control bars, 20. The short arm, 46, of the bell crank, 45, contacts with the short arm, 47, of a second bell crank, 48, which is the other actuator of the bar. The long arm of the bell crank, 45, in addition to engaging with the lever, 40, extends under the control bars, 20, in position to engage abutments, 49, on one or more of the bars, 20, which abutments may be formed as rivet heads or screw heads projecting from the under surfaces of the bars. The long arm of the bell crank, 48, similarly engages with like abutments or projections, 50, extending from the upper surfaces of the remaining bars, 20, of the group. Thus each pair of actuator levers, 45 and 48, has a one-way drive connection with all the control bars, 20, some of the bars being driven in one direction and the remainder of the bars being driven in the opposite direction when the long arms of the actuator levers, 45 and 48, are moved apart by manipulation of the corresponding shifter lever, 41, or one of its connected levers, 41ª. A guide bar, 51 extends over the long arms of the levers, 45, to hold them in proper relation to the control bars, 20, and the pivots of the levers, 48, are supported in a bar, 52, which extends over the short arms of the levers and holds them in operative relation to the short arms, 46, of the levers, 45.

Each pair of actuator levers, 45 and 48, with its operating shifter handle, 41, thus represents a particular set-up or combination of reeds which are arranged to be sounded together by the shifting of certain bars, 20, into position for opening their connected slide valves, 4, and shifting the remaining bars, 20, in the opposite direction to ensure closure of the other slide valves. The particular groups of reeds entering into any combination will be indicated by the abutments, 49, contacting with any given lever, 45, while the abutments, 50, represent those groups of reeds which will be omitted from the combination when the control bars are shifted by engagement of a given lever, 48, with these abutments.

For convenience in assembly and also in removing or replacing any of the reed blocks, 6, if necessary, Figures 5 and 6 show a slidable fastener lug, 55, secured to the reed block near one end and formed with an up-turned portion, 56, by which it may be shifted for engagement of its beveled end with a yielding metallic retainer strip, 57, which is mounted just inside the adjacent end wall, 13a, of the wind-chest. At the opposite end of the reed block I provide another slidably mounted lug, 58, adapted to engage under an angle fitting, 59, secured on the inner surface of the end wall, 13. This lug is also beveled at its extreme end, and in this case the resilient action is afforded by means of a flat spring, 60, disposed under the lug, 58, that is, between it and the surface of the reed block terminal. A transverse slot, 61, is formed in the lug, 58, to receive a screw driver blade, the edge of a coin, or any other convenient tool, for shifting the lug into or out of engagement with the angle, 59.

With the shift mechanism herein described, the player can change instantly, and without appreciable effort, from one reed combination to another by merely swinging one of the levers, 41 or 41a, with any finger which happens to be available; and because of the duplicate—or, as herein illustrated, triplicate—provision of these levers, he can do this without taking the other fingers of his hands from the keys, wherever they may be at the moment. And because any other combination of reeds which he may wish to employ will involve shifting at least one of the bars, 20, from its adjusted position to the opposite limit of its range of movement, this reverse movement of that bar will operate to return the previously shifted handle, 41, and its connected handles, 41a, to their initial position. The same thing is always accomplished when the shifter bar, 30, is pressed for returning all control bars to the position corresponding to open position of all the slide valves, 4; but until a different combination of reeds is wanted, the position of the last used lever, 41 (at an angle to its normal initial position) will serve as an indicator to show what particular reed combination is set up for the time being. With all the levers, 41, in their normal initial positions, and the bar, 30, at the inner limit of its range it will be understood that the full accordion combination is in service.

It will be recognized that the control system herein illustrated may be amplified to afford a much larger number of reed combinations than is provided in the instrument shown in the drawings, and that this increased range of performance may be secured with very slight additional mechanism—merely the provision of more actuator mechanisms comprising shifter handles, 41, and their associated pairs of actuators, 45 and 48.

On the other hand, some features of this invention are applicable to a simpler form of accordion in which there may be only two available combinations or groupings of the reeds, one key the "full accordion" effect and the other being secured by shifting one or more slide valves to closed position. For such an arrangement the key manual support which is indicated in outline at 70 in Figures 7 and 8, may be fitted with a shifter lever, 71, and similar levers, 71a, may be provided in spaced relation to the lever, 71, also adjacent the manual and inter-connected therewith by means of a bar, 72, pivotally attached to arms, 73, at the under side of the manual support, 70. It may be understood that the arms, 73, are rigidly connected respectively with the handle or lever, 71, and the similar handles, 71a, through crank members extending through the rear rail or frame element, 74, of the key manual support, 70. Figure 8 indicates screw heads, 75, by which it may be understood the arms, 73, are clamped to the ends of such crank members, being made separable therefrom for convenience of assembly in the frame.

Thus the handle, 71, or one of the handles, 71a, is within convenient reach of the player wherever his hand may be on the keyboard at the moment when he desires to operate the shift, and such operation involves merely swinging the lever, 71, from one limit of its position, as shown in full lines in Figure 7, to the opposite limit indicated in dotted outline. Such movement being transmitted through the arm, 73, and bar, 72, actuates a lever, 76, connected to the bar, 72, by a pin, 77, and fulcrumed at 78 in the wall of the reed chest, 79. The lever, 76, has an arm, 80, within the reed chest connected by a link, 81, to the crank arm, 82, of a rock shaft, 83, mounted on the end wall of the reed chest. The rock shaft may have one or more arms, 84, connected to the slide valve or valves, 85, which it is desired to shift so that the angular movement of the lever, 71, in one direction serves to open the slide valve, 85, and a similar swing of the lever in the opposite direction serves to close the slide, thus securing the special reed combination which is other than "full accordion". It may be understood that in the simpler instruments, when the dimensions of the key manual afford sufficient space, I may provide more than one set of levers like the lever, 71, each set being connected for positively shifting a slide or slides in both directions and without inter-connection with the other set. However, for the more complicated arrangements, it is preferable to have the levers positively operate in one direction only, and allow each set of levers to be returned automatically without actuation of any other set.

While there is shown and described herein certain specific structure embodying the invention, it will be manifest to those skilled in the art that various modifications and rearrangements of the parts may be made without departing from the spirit and the scope of the invention, and that the same is not limited to the particular form herein shown and described, except in so far as indicated by the appended claims.

I claim:

1. In an accordion a plurality of groups of reeds, a common valve member for each group movable in one direction to open position and in reverse direction to closed position, a plurality of control members each connected to one of said common valves, a plurality of manually operable shifters each including two actuator parts movable simultaneously in opposite directions, one of said parts being engageable with one or more of the control members for causing movement thereof in one direction while the other actuator part is engageable with the remaining control member or members for causing movement thereof simultaneously in the opposite direction when the corresponding shifter is operated.

2. In an accordion a plurality of groups of reeds, a common valve member for each group movable in one direction to open position and in reverse direction to closed position, a plurality of control members each connected to one of said common valves, a plurality of manually operable shifter mechanisms each including means engageable with one or more of the control members for causing movement thereof in one direction, and means engageable with the remaining control member or members for causing movement thereof simultaneously in the opposite direction.

3. In an accordion, a plurality of groups of reeds, a common valve member for each group movable in one direction to open position and in reverse direction to closed position, a plurality of control members each connected to one of said common valves, a manually operable shifter mechanism including means engageable with one or more of the control members for causing movement thereof in one direction, and means engageable with the remaining control member or members for causing movement thereof simultaneously in the opposite direction.

4. In an accordion a plurality of groups of reeds, a common valve member for each group movable in one direction to open position and in reverse direction to closed position, a manually operable shifter mechanism having one-way drive connections with said valve members, certain of said connections being engageable for causing movement of one or more of the valve members in one direction while the remaining connections are engageable for causing movement of the remaining valve member or members simultaneously in the opposite direction.

5. In an accordion, a plurality of groups of reeds, a common valve member for each group movable in one direction to open position and in reverse direction to closed position, a plurality of control members each connected to one of said common valves, a manually operable shifter mechanism including means engageable with one or more of the control members for causing movement thereof in one direction, and means engageable with the remaining control member or members for causing movement thereof simultaneously in the opposite direction, together with a second manually operable shifter mechanism including a part engageable with any of the control members when their connected valve members are at closed position, said part being movable in a direction to cause movement of said valve members simultaneously to open position, whereby actuation of said second shifter leaves all the valve members at open position.

6. In an accordion, a plurality of groups of reeds, a common valve member for each group movable in one direction to open position and in reverse direction to closed position, a plurality of control members each connected to one of said common valves, a manually operable shifter mechanism including means engageable with one or more of the control members for causing movement thereof in one direction, and means engageable with the remaining control member or members for causing movement thereof simultaneously in the opposite direction, and another manually operable shifter also including two actuator parts movable simultaneously in opposite directions, one of said parts being engageable with a certain control member or members for causing movement thereof in one direction, at least one of said members being different from the control member or members movable in the same direction by the first mentioned shifter and the other actuator part of the second shifter being engageable with the remaining control member or members for moving them simultaneously in the opposite direction.

7. In an accordion, a plurality of groups of reeds, a common valve member for each group movable in one direction to open position and in reverse direction to closed position, a plurality of control members each connected to one of said common valves, a manually operable shifter mechanism including means engageable with one or more of the control members for causing movement thereof in one direction, and means engageable with the remaining control member or members for causing movement thereof simultaneously in the opposite direction, and another manually operable shifter also including two actuator parts movable simultaneously in opposite directions, one of said parts being engageable with a certain control member or members for causing movement thereof in one direction, at least one of said members being different from the control member or members movable in the same direction by the first mentioned shifter and the other actuator part of the second shifter being engageable with the remaining control member or members for moving them simultaneously in the opposite direction, said shifters being movable reversely by reverse movement of one or more of the control members which they operate, whereby the actuation of either shifter serves to return the other to its initial position.

8. In an accordion, a plurality of groups of reeds, a common valve member for each group movable in one direction to open position and in reverse direction to closed position, and a plurality of manually-operable shifters each having connections adapted to actuate a different combination of the common valve members for placing in service a different combination of reed groups, said shifters being mounted directly over the key manual of the accordion and each shifter being movable from an initial inactive position to an active position and adapted to remain in active position as long as the reed combination which it controls remains in service.

9. In an accordion, a plurality of groups of reeds, a common valve member for each group movable in one direction to open position and in reverse direction to closed position, a plurality of control bars slidably mounted in parallel relation to each other and each connected to one of said common valves, a plurality of manually operable shifter mechanisms each including means engageable with one or more of the control bars for sliding it or them in one direction, and means engageable with the remaining bar or bars for sliding it or them simultaneously in the opposite direction.

10. In the combination defined in claim 3, said control members comprising bars slidably mounted in parallel relation, certain of said bars having abutments engageable by the shifter mechanism for moving them in one direction, and the remaining bar or bars having abutments engageable by said shifter mechanism for moving them in the opposite direction.

11. In the combination defined in claim 1, the said control members comprising bars slidably mounted in parallel relation, each bar having an abutment, and the two actuator parts being in the form of levers each having an arm extending across the bars, the abutments of one or more bars being positioned to be engaged by one of said levers for movement in one direction and the abutments of the remaining bar or bars being engageable with the other lever arm for movement in the opposite direction.

12. In an accordion, a plurality of groups of reeds, a common valve member for each group movable in one direction to open position and in reverse direction to closed position, and a plurality of manually-operable shifters each having connections adapted to actuate a different combination of the common valve members for placing in service a different combination of reed groups, said shifters being formed as lever arms extending over the manual keys of the accordion near their inner ends and each swingable in a plane approximately parallel to the upper surface of the keys in an arc extending lengthwise of the manual.

13. In an accordion, a plurality of groups of reeds, a common valve member for each group movable in one direction to open position and in reverse direction to closed position, and a plurality of manually-operable shifters each having connections formed and positioned to engage and to actuate a different combination of the common valve members for placing in service a different combination of reed groups, and means operable simultaneously with each shifter and engageable with any other shifters then standing in active position for returning them to initial position.

14. In an accordion, a plurality of groups of reeds, a common valve member for each group movable in one direction to open position and in the reverse direction to closed position, a plurality of control bars slidably mounted in parallel relation to each other, a manually operable shifter including two actuator levers each having an arm extending across said bars, some of the bars having abutments engageable by one of said lever arms and the remaining bar or bars having abutments engageable by the other lever arm, said levers being inter-connected for simultaneously swinging in opposite directions to shift the corresponding bars oppositely for closing a portion of said common valve members and opening the remainder to place a desired combination of reed groups in service.

15. In an accordion, a wind-chest including a ported wall, a reed block mounted against said wall and provided with a slide valve having a terminal extending from the end of the reed block in spaced relation to said wall, together with means for slidably adjusting said valve member comprising a movable member having a terminal portion extending away from the plane of the wall, said valve terminal having an aperture fitting over said terminal portion and disengageable therefrom as the reed block is moved away from the wall in the process of dismounting said reed block therefrom.

16. In an accordion comprising a wind-chest including a ported wall and an end wall extending transversely therefrom, a reed block secured against the ported wall within the wind-chest and having a slide valve with a terminal portion projecting from the end of the block in spaced relation to the ported wall, said terminal being apertured, and means for shifting the valve comprising a rock shaft, with bearings by which it is supported on the end wall, and an arm extending from the shaft toward the ported wall, said arm having a terminal portion pointing away from said ported wall into engagement with the aperture of the slide valve terminal.

17. In an accordion, a wind-chest including a ported wall, a reed block and means for securing said reed block against the ported wall comprising a lug slidably mounted on the end portion of the block for protrusion of its terminal beyond the end of the block, and a fixed abutment in the wind-chest having a surface facing the ported wall and spaced therefrom in position to be engaged by said lug when it is protruded, whereby the reed block is locked into engagement with the wall.

18. In an accordion, a wind-chest including a ported wall, a reed block and means for securing said reed block against the ported wall comprising a pair of lugs slidably mounted on the opposite end portions respectively of the reed block for protrusion of its terminal beyond the end of the block, and fixed abutments at opposite ends of the wind-chest each having a surface facing the ported wall and spaced therefrom in position to be engaged by one of the lugs when they are protruded, whereby the reed block is locked into engagement with the wall.

19. In the combination defined in claim 17, the terminal portion of the slidable lug being beveled to facilitate its engagement with the abutment, and one of the inter-engaging parts being yieldable to ensure a continuous pressure for holding the reed block in contact with the ported wall.

20. In an accordion, a piano type keyboard and reeds controlled thereby, a slide valve for supplemental control of certain reeds, and means for shifting said slide valve at will including a handle pivoted to swing in a plane substantially parallel to the plane of the keys and spaced slightly above said keys extending over the inner end portions thereof.

21. In an accordion, a piano type keyboard and reeds controlled thereby, a slide valve for supplemental control of certain reeds, and means for shifting said slide valve at will including a handle pivoted to swing in a plane substantially parallel to the plane of the keys and spaced slightly above said keys extending over the inner end portions thereof, together with connections between said handle and said valve whereby movement of the handle about its pivot in one direction opens the valve, and movement of said handle in the opposite direction closes the valve.

22. In an accordion, a piano type keyboard and reeds controlled thereby, a slide valve for supplemental control of certain reeds, and means for shifting said slide valve at will including a plurality of handles pivoted to swing in a plane substantially parallel to the plane of the keys and spaced slightly above said keys extending over the inner end portions thereof, said handles being spaced apart longitudinally of the keyboard and mechanically connected for simultaneous movement so that actuation of any one of them operates the slide valve.

23. In an accordion, a piano type keyboard and reeds controlled thereby, a slide valve for supplemental control of certain reeds, and means for shifting said slide valve at will including a plurality of handles pivoted to swing in a plane substantially parallel to the plane of the keys and spaced slightly above said keys extending over the inner end portions thereof, said handles being spaced apart longitudinally of the keyboard and mechanically connected for simultaneous movement, together with connections between said handles and said valve whereby movement of the handles about their pivots in one direction opens the valve, and movement of said handles in the opposite direction closes the valve.

24. In the combination defined in claim 9, the first means of the shifter mechanism being engageable with abutments each disposed on one surface of the one or more control bars, and the other means of the shifter mechanism being engageable with abutments disposed in a different plane and projecting from the remaining bar or bars for the purpose indicated.

25. In an accordion, a chamber having a wall provided with openings for the passage of air for vibrating the reeds, key-controlled valves for said openings, a plurality of additional valves for said openings, each of said additional valves being movable to two positions to cover said openings and to uncover said openings, respectively, individual shift keys and mechanisms actuated thereby for moving said additional valves to one of said positions, and means additional to said shift keys and operable independently of the latter for moving any of said additional valves from said one position to the other of said positions.

26. In an accordion, a chamber having a wall provided with openings for the passage of air for vibrating the reeds, key-controlled valves for said openings, a plurality of additional valves for said openings, each of said additional valves being movable to two positions to cover said openings and to uncover said openings, respectively, individual shift keys and mechanisms actuated thereby for moving said additional valves to one of said positions, and means separate from said shift keys and operable independently of the latter for returning all shift key actuated valves simultaneously to their initial positions.

27. In an accordion, a chamber having a wall provided with openings for the passage of air for vibrating the reeds, key-controlled valves for said openings, a plurality of additional valves for said openings, each of said valves being movable from initial positions to positions for closing said openings, a keyboard for the keys of said first mentioned valves, means for selectively moving said additional valves from initial positions to positions for closing said openings, said means including a plurality of members positioned at one side of said keyboard and accessible externally of the accordion, and means for returning said additional valves from their said last mentioned positions to their initial positions including a member movably mounted at the other side of said keyboard.

28. In an accordion, a chamber having a wall provided with openings for the passage of air for vibrating the reeds, key-controlled valves for said openings, a plurality of additional valves for said openings, each of said valves being movable from initial positions to positions for closing said openings, a keyboard for the keys of said first mentioned valves, means for selectively moving said additional valves from initial positions to positions for closing said openings, said means including a plurality of pivotally mounted members positioned at one side of said keyboard and accessible externally of the accordion, and means for returning said additional valves from their said last mentioned positions to their initial positions including a shift bar slidably mounted at the opposite side of said keyboard.

VAUGHN E. MORRISON.